No. 773,943.

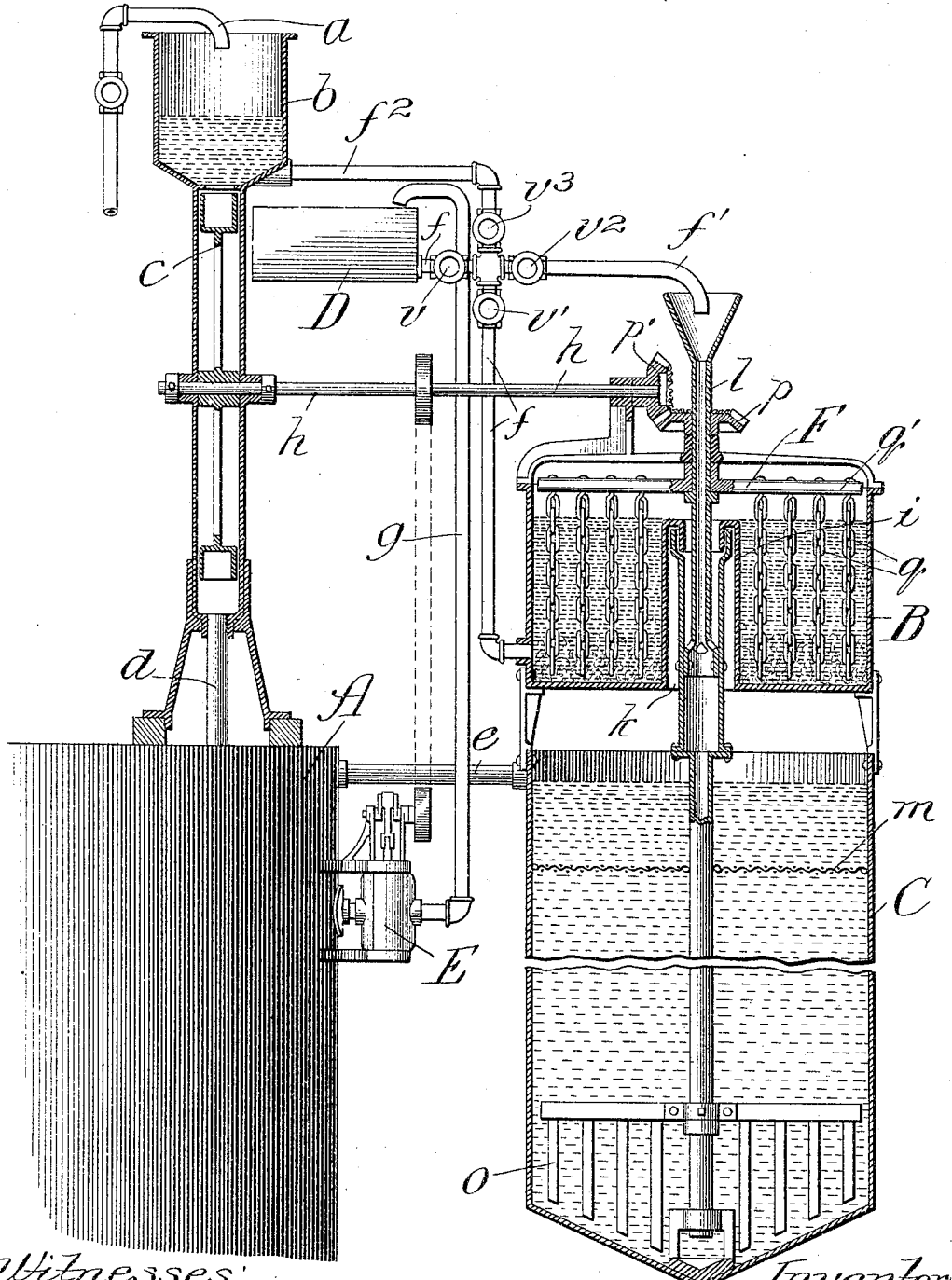

Patented November 1, 1904.

UNITED STATES PATENT OFFICE.

CASS L. KENNICOTT, OF CHICAGO, ILLINOIS, ASSIGNOR TO KENNICOTT WATER-SOFTENER COMPANY, OF CHICAGO, ILLINOIS, A CORPORATION OF ILLINOIS.

WATER-PURIFYING APPARATUS.

SPECIFICATION forming part of Letters Patent No. 773,943, dated November 1, 1904.

Application filed May 6, 1904. Serial No. 206,659. (No model.)

*To all whom it may concern:*

Be it known that I, CASS L. KENNICOTT, a citizen of the United States, residing at Chicago, in the county of Cook and State of Illinois, have invented a new and useful Improvement in Water-Purifying Apparatus, of which the following is a specification.

My invention relates to an improvement in the class of water-purifying apparatus exemplified in my United States Patents Nos. 646,108, 665,606, and 703,596.

The primary object of my invention is to render the apparatus more automatic in its operation, thereby greatly to reduce the labor, care, and expense attendant upon its use, particularly in the matters of preparing for and supplying to the water under treatment the chemical reagent or reagents for treating it.

The accompanying drawing shows by a view in elevation, mainly sectional, a water-purifying apparatus provided with my improvement.

A is the precipitating-tank into which the raw water to be treated flows from a pipe $a$ into a box $b$, thence over a water-wheel $c$ through a pipe $d$ or nozzle leading to the tank. B is a lime-slaker box discharging the milk of lime produced in it into a lime-saturater C, which overflows through a pipe $e$ into the tank A, and a soft-water holder D discharges into the box B. The parts of the apparatus thus named may be relatively disposed, as shown in the drawing herein or in accordance with their disposition represented in either of the aforesaid patents or in any other suitable manner.

Hitherto it has been the practice to charge periodically—say once in each twelve hours— the milk-of-lime contents of the slaking-box into the saturater while the water (raw or previously softened) for producing lime-water in the saturater is being fed thereto in predetermined proportion. The quantity of the milk of lime—say two hundred gallons—being in excess of the quantity of the water for producing the solution regularly admitted into the saturater necessarily surcharges the latter for the time being by introducing into it an excess of lime, which not only wastes the lime, but overtreats the water in the precipitating-tank to which the lime-water is fed, with deleterious results, such as hardening it. I overcome this difficulty by providing for automatically supplying continuously the milk of lime from the slaker-box to the saturater.

The slaker-box communicates through a pipe $f$, containing valves $v$ and $v'$, with the soft-water holder D, which is fed through a pipe $g$, leading to it from the upper part of the precipitating-tank A by a pump E of any suitable construction interposed in the last-named pipe and geared for working it with a drive-shaft $h$, extending from the water-wheel $c$, to be actuated by the latter, and thus by the power of the water flowing from the pipe $a$. A tubular overflow-head $i$ rises in the box B about an opening $k$ in its base, through which and the head $i$ a hollow shaft $l$, having a funnel-shaped upper end, extends vertically downward nearly to the base of the saturater C, below the slaker-box, and containing a screen $m$. The shaft $l$ carries on its lower end a stirrer $o$ and near its upper end a beveled gear $p$, with which meshes a beveled pinion $p'$ on the water-wheel shaft $h$ for driving from it the stirrer-shaft. A branch or by-pass $f'$, containing a valve $v^2$, leads from the pipe $f$ to the inlet end of the shaft $l$, and a pipe $f^2$, containing a valve $v^3$, leads from the water-box $b$ into the pipe $f$ between the valves $v$ $v'$ therein.

On the shaft $l$ is secured to rotate with it a stirring device F for the contents of the receptacle B. Where lime is the reagent employed in the box B, it is supplied in lumps to be slaked, requiring that it be stirred by hand and that it be screened to free it from stones and other impurities. No ordinary mechanical stirring device is suitable for lime in that condition because of the obstruction it presents to the movement of the stirrer; but I employ one which not only operates perfectly in performing the stirring function, but which also gradually and easily disintegrates the lumps of lime. It consists of a plurality of heavy link chains $q$, depending from the head $q'$, secured on the shaft $l$, rotation of which drags the chains through and over the mass of lumps in the box with the effect described.

In the operation of the apparatus, wherein the pump E keeps the holder D supplied with softened water from the tank A, the water for slaking the lime may be taken from the holder D on opening the valves $v$ and $v'$. By opening the valve $v^2$ a suitable proportion of the softened water is directed through the by-pass $f'$ into the saturater C, through the rotating shaft $l$ to dilute the milk of lime discharging into it through the overflow $i$ and form the lime-water, which overflows into the tank A through the pipe $c$. When it is desired to use raw water for supplying the box B and saturater C, this may be done by closing the valve $v$ and opening the valve $v^3$ in the pipe $f^2$.

From the foregoing description of my improvement it will be seen that it dispenses with nearly all labor in the care of the apparatus, rendering it practically automatic in its operation, since all that is required is to dump the material into the box B as the supply therein becomes exhausted, and the apparatus itself takes care of the rest of the work of purifying the water supplied to it.

Lime is the reagent more commonly used in the box B. Hence my designation thereof as a "lime-slaker." Other reagents may, however, be required and used therein for treating different waters, and some of them, such as barium carbonate, may be in lump form, for reducing which the chain form of stirrer is desirable. Hence I do not wish my use of the term "lime-slaker" to be understood as limiting my improvement to a holder B for that exclusive purpose.

What I claim as new, and desire to secure by Letters Patent, is—

1. In a water-purifying apparatus, the combination with a precipitating-tank, of a box for lime-slaking and the like, a saturater into which said box overflows continuously and automatically, a water-supply pipe discharging into said box, and a by-pass branch of said pipe discharging into the saturater.

2. In a water-purifying apparatus, the combination with a precipitating-tank, of a box for lime-slaking, and the like, a saturater, an overflow leading from the liquid-level in said box into the saturater, and means for supplying water to said box and saturater.

3. In a water-purifying apparatus, the combination with a precipitating-tank, of a box for lime-slaking, and the like, a saturater, an overflow leading from the liquid-level in said box into the saturater, a water-supply pipe discharging into said box, and a by-pass branch of said pipe discharging into said saturater.

4. In a water-purifying apparatus, the combination with a precipitating-tank, of a saturater, a box for lime-slaking and the like, surmounting said saturater and discharging into it through an overflow-head in the box, a rotary tubular shaft extending through the overflow-head in said box into the saturater and carrying in the latter a stirrer, a water-supply pipe discharging into said box, and a by-pass branch of said pipe discharging into the tubular shaft.

5. In a water-purifying apparatus, the combination of a precipitating-tank, a soft-water holder, a saturater, a box for lime-slaking, and the like, discharging into the saturater, and a pipe leading from said holder to said box and having a by-pass branch discharging into the saturater.

6. In a water-purifying apparatus, the combination of a precipitating-tank into which the water to be treated is directed, means for transmitting the power of the flow of said water into the tank, a soft-water holder, a saturater, a box for lime-slaking, and the like, containing a rotary stirrer geared to said power-transmitting means, and discharging into the saturater, and a pipe leading from said holder to said box and having a by-pass branch discharging into the saturater.

7. In a water-purifying apparatus, the combination of a precipitating-tank, a box into which the water to be treated flows in its course to said tank, a soft-water holder, a saturater, a box for lime-slaking, and the like, discharging into the saturater, a pipe leading to said holder from said slaking-box, and containing valves and having a valved by-pass branch discharging into the saturater, and a valved pipe connecting said water-box with said pipe between its valves.

8. In a water-purifying apparatus, the combination of a precipitating-tank, a water-wheel discharging through a pipe into said tank and surmounted by a box into which the water to be treated flows, a power-transmitting shaft extending from the water-wheel, a soft-water holder, a pipe leading from said tank and discharging into said holder, a force-pump in said pipe geared to said shaft to be driven thereby, a saturater, a box for lime-slaking, and the like, discharging into said saturater, a tubular rotary shaft extending through the slaking-box into the saturater, carrying therein a stirrer and geared to said power-shaft to be rotated by it, a stirrer on the shaft in said slaking-box, and a pipe leading from said holder to said slaking-box and having a by-pass branch discharging into said tubular shaft.

CASS L. KENNICOTT.

In presence of—
M. S. MACKENZIE,
WALTER N. WINBERG.